United States Patent
Sun et al.

(10) Patent No.: US 9,585,190 B2
(45) Date of Patent: Feb. 28, 2017

(54) METHOD AND APPARATUS FOR DETERMINING DORMANCY TIMER VALUE

(71) Applicant: Telefonaktiebolaget L M Ericsson (publ), Stockholm (SE)

(72) Inventors: Qian Sun, Guangzhou Guang Dong (CN); Xiaoyu Zhang, Guangzhou Guang Dong (CN); Cheng Zeng, Guangzhou Guang Dong (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 41 days.

(21) Appl. No.: 14/649,270

(22) PCT Filed: Dec. 5, 2012

(86) PCT No.: PCT/CN2012/085904
§ 371 (c)(1),
(2) Date: Jun. 3, 2015

(87) PCT Pub. No.: WO2014/085995
PCT Pub. Date: Jun. 12, 2014

(65) Prior Publication Data
US 2015/0312961 A1    Oct. 29, 2015

(51) Int. Cl.
*H04W 76/06* (2009.01)
*H04W 52/02* (2009.01)
*H04W 72/04* (2009.01)
*H04W 76/04* (2009.01)

(52) U.S. Cl.
CPC ..... *H04W 76/066* (2013.01); *H04W 52/0258* (2013.01); *H04W 72/0453* (2013.01); *H04W 76/045* (2013.01); *H04W 76/068* (2013.01)

(58) Field of Classification Search
CPC .......... H04W 76/066; H04W 52/0258; H04W 72/0453; H04W 76/045
USPC ....................................................... 370/330
See application file for complete search history.

(56) References Cited

U.S. PATENT DOCUMENTS

2012/0124196 A1    5/2012  Brisebois et al.
2012/0281561 A1*  11/2012  Shukla ............... H04W 76/068
                                                        370/252

FOREIGN PATENT DOCUMENTS

| CN | 101325604    | 12/2008 |
| CN | 102695279    | 6/2012  |
| WO | WO 03/079659 | 9/2003  |

OTHER PUBLICATIONS

PCT Notification of Transmittal of the International Search Report and the Written Opinion of the International Searching Authority, or the Declaration of International application No. PCT/CN2012/085904, Sep. 12, 2013.
Extended European Search Report for Application No./Patent No. 12889703.0-1505/2929715 PCT/CN2012085904—Jun. 28, 2016.

* cited by examiner

*Primary Examiner* — Ronald B Abelson
(74) *Attorney, Agent, or Firm* — Baker Botts, LLP

(57) ABSTRACT

Embodiments of the disclosure provide a method and apparatus for determining a dormancy timer value in a wireless network. According to the method, historical traffic information for at least one radio link in the wireless network may be obtained, and a dormancy timer value for the at least one radio link may be determined based on the obtained historical traffic information.

18 Claims, 6 Drawing Sheets

METHOD AND APPARATUS FOR DETERMINING DORMANCY TIMER VALUE

PRIORITY

This nonprovisional application is a U.S. National Stage Filing under 35 U.S.C. §371 of International Patent Application Serial No. PCT/CN2012/085904, filed Dec. 5, 2012, and entitled "METHOD AND APPARATUS FOR DETERMINING DORMANCY TIMER VALUE."

TECHNICAL FIELD

Embodiments of the present invention generally relate to communication techniques. More particularly, embodiments of the present invention relate to a method and apparatus for determining a dormancy timer value in a wireless network.

BACKGROUND

In a wireless network, e.g. Radio Access Network (RAN), due to insufficient radio link resource (e.g. channel element, modem driver flow or Mac index), there may be users trying to setup more radio links to receive/transmit data than the wireless network actually has, especially in some cell sites or in busy hour. Hence, it would be preferred that a radio link occupied by a user could be released when the user doesn't receive/transmit data for a certain time period, so that the inactive radio link can be reused by other users.

In view of this, existing technologies have proposed a concept of dormancy timer. Upon reservation of a radio link, a dormancy timer may be set. As the source and destination transfer packet data over the channel, the radio link transitions to an active state. Upon completion of the transfer, the radio link enters a dormant state and a timer begins. When this timer exceeds the dormancy timer value, the radio link is closed and the resources are returned to the network for allocation to another user.

According to existing solutions, generally, the dormancy timer value is configured as a constant value, e.g. 10 seconds, for all radio links in a RAN. In some other existing solutions, an adaptive dormancy timer is employed, wherein the dormancy timer value may be varied according to numbers of current radio links in the wireless network. In particular, when the number of current radio link is less than 41, the timer may be set to a relatively high value, e.g., 10 seconds; when the number of current radio link is between 41 to 46, the timer may be set to a medium value, e.g., 7 seconds; and when the number of current radio link is larger than 46, the timer may be set to a relatively low value, e.g., 5 seconds.

However, the dormancy timer value designed by above existing solutions is usually not accurate enough, thus inconvenience will be introduced. If this timer is set too long, unnecessary reservation of network channels and wasted bandwidth may be caused. For example, a user might occupy a radio link resource for too long time even the user doesn't actually utilize the radio link; as a result, other users who want to use the radio access network cannot be admitted due to insufficient radio link resource. On the other hand, if this timer is set too short, then a radio link may be released before the user is going to use it very soon. As such, there may be frequent setup and/or release of radio link(s), which will lead to poor user experience on responding speed and high overhead to both radio link and the RAN.

In view of the foregoing problems, there is a need to determine a more accurate value for the dormancy timer, so as to improve resource utilization and user experience in the wireless network.

SUMMARY

The present invention proposes a solution which determines a dormancy timer value in a wireless network. Specifically, embodiments of the present invention provide methods and apparatuses for determining a dormancy timer value, which can effectively increase resource utilization and improve user experience.

According to a first aspect of the present invention, embodiments of the invention provide a method for determining a dormancy timer value in a wireless network. According to the method, historical traffic information for at least one radio link in the wireless network may be obtained, and a dormancy timer value for the at least one radio link may be determined based on the obtained historical traffic information.

According to a second aspect of the present invention, embodiments of the invention provide an apparatus for determining a dormancy timer value in a wireless network. The apparatus may comprise: an obtainer and a determiner. The obtainer may be configured to obtain historical traffic information for at least one radio link in the wireless network. The determiner may be configured to determine a dormancy timer value for the at least one radio link based on the obtained historical traffic information.

According to a third aspect of the present invention, embodiments of the invention provide an apparatus for determining a value of a dormancy timer in a wireless network. The apparatus may comprise: at least one processor; and at least one memory including compute program instructions, wherein the at least one memory and computer program instructions are configured to, with the at least one processor, cause the apparatus at least to: obtain historical traffic information for at least one radio link in the wireless network; and determine a dormancy timer value for the at least one radio link based on the obtained historical traffic information.

According to a fourth aspect of the present invention, embodiments of the invention provide a computer program product. The computer program product may comprises at least one computer readable storage medium having a computer readable program code portion stored thereon, the computer readable program code portion comprising: program code instructions for obtaining historical traffic information for at least one radio link in the wireless network; and program code instructions for determining a dormancy timer value for the at least one radio link based on the obtained historical traffic information.

Compared with those existing solutions, the proposed solution determines a dormancy timer value based on historical traffic information for at least one radio link, such that the resource utilization may be efficiently increased and the user experience may be effectively improved.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

Throughout the figures, same or similar reference numbers indicate same or similar elements.

DETAILED DESCRIPTION

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

Embodiments of the present invention provide a method and apparatus for determining a dormancy timer value in a wireless network. As further discussed below, historical traffic information for at least one radio link in the wireless network may be obtained first. Based on the historical traffic information, the dormancy timer value for the at least one radio link may be determined, e.g., in a more accurate way. In this way, the radio link(s) may be more efficiently utilized in view of the determined dormancy timer value. Accordingly, the user experience may be effectively improved and the overhead of the wireless network may be reduced. Now some exemplary embodiments of the present invention will be described below with reference to the figures.

Figure 1:
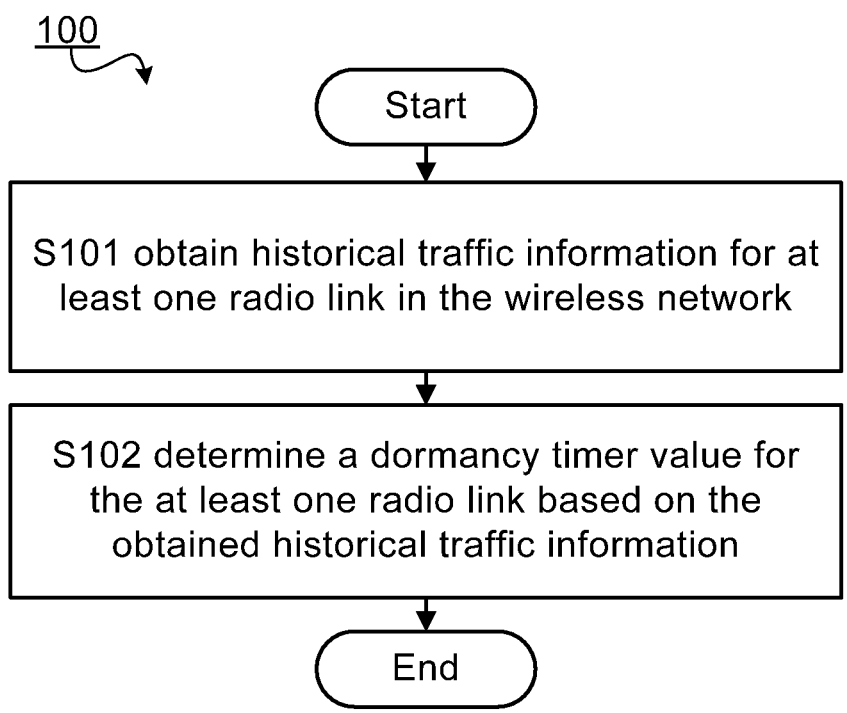
FIG. 1 illustrates a flow chart of a method 100 for determining a dormancy timer value according to an embodiment of the invention.

Reference is first made to FIG. 1, which illustrates a flow chart of a method 100 for determining a dormancy timer value according to an embodiment of the invention. In accordance with embodiments of the present invention, method 100 may be carried out by, for example, a radio network controller (RNC), a base station (BS), a base station controller (BSC), a gateway, a relay, a server, or any other applicable device.

After method 100 starts, at step S101, historical traffic information for at least one radio link in the wireless network is obtained.

In accordance with embodiments of the present invention, traffic information for a radio link in a wireless network may comprise multiple information on traffic regarding the radio link, for example, the time that traffic begins in the radio link, the time that traffic ends in the radio link, active duration(s) of the radio link, inactive duration(s) of the radio link, and/or the like. In embodiments of the present invention, an active duration of a radio link means that there is traffic on this radio link in the duration, and an inactive duration of a radio link refers to that there is no traffic on this radio link in the duration.

The historical traffic information may refer to information on the traffic happened previous to the current instant. For example, the historical traffic information may comprise traffic information during a period of passed time, wherein the traffic information may relate to one or more of the radio link in the wireless network. For another example, the historical traffic information may comprise all traffic information prior to the current instant, wherein the traffic information may relate to one or more of the radio link in the wireless network. The period of passed time is sometimes referred to as a time window. The end of the time window may be an instant before the present instant, and the start of the time window may be an instant before the end of the time window. The length of the time window may be a fixed value or a variable value, which may be predetermined by the operator or preset according to conditions of the wireless network. According embodiments of the present invention, a time window may comprise at least one time slot, wherein a time slot is a period of time which is generally less than the length of the time window. In some embodiments, the historical traffic information for at least one radio link may comprise information on active time slot(s) of the at least one radio link, information on inactive time slot(s) of the at least one radio link, and/or the like.

According to embodiments of the present invention, there may be several ways to obtain historical traffic information for a radio link. For example, traffic information for the at least one radio link during a time window may be obtained as the historical traffic information. In accordance with embodiments of the present invention, the historical traffic information may be obtained by first dividing the time window into a plurality of time slots, and determining whether there is traffic on the at least one radio link in each of the plurality of time slots. In response to determining that there is no traffic on the at least one radio link in a time slot, the time slot may be marked as an inactive time slot. In response to determining that there is traffic on the at least one radio link in a time slot, the time slot may be marked as an active time slot.

At step S102, a dormancy timer value for the at least one radio link is determined based on the obtained historical traffic information.

According to some embodiments of the present invention, an identical dormancy timer value may be determined for all radio links in the wireless network. According to further embodiments of the present invention, a dormancy timer value may be determined for some of radio links in the wireless network. For example, supposing there are 10 radio links in the wireless network, a first dormancy timer value may be determined for the first three radio links, a second dormancy timer value may be determined for the fourth radio link, a third dormancy timer value may be determined for the fifth and sixth radio links and a fourth dormancy timer value may be determined for the seventh to tenth radio links. In other words, there may be several dormancy timers in one wireless network, and the value of one dormancy timer may be determined for one or multiple radio links. According to still further embodiments of the present invention, a dormancy timer value may be determined for each of the radio links in the wireless network based on the historical traffic information. For example, with respect to the 10 radio links in the wireless network, 10 dormancy timer values may be set, one dormancy timer value for one of the radio links; accordingly, 10 dormancy timer values may be determined based on historical traffic information of the 10 radio links.

In accordance with embodiments of the present invention, at least one inactive time slot may be identified from a time window during which the historical traffic information is obtained, wherein there is no traffic on the at least one radio link in the inactive time slot. Then, the dormancy timer value may be determined for the at least one radio link based on the at least one inactive time slot. In some embodiments, the at least one inactive time slot may be classified into one or more inactive time slot sets according to time continuity of the at least one inactive time slot, such that inactive time slots in one inactive time slot set are continuous; the number of inactive time slot in each of the one or more inactive time slot sets may be acquired; and the dormancy timer value may be determined according to the number of inactive time slot in each of the one or more inactive time slot sets.

According to some embodiments of the present invention, the dormancy timer value may be determined in multiple ways. For example, cumulative density function (CDF) may be first performed on the numbers of inactive time slot in the one or more inactive time slot sets, and then a value that maps to a predetermined percentage in the CDF may be calculated as the dormancy timer value. For another example, an average of the numbers of inactive time slot in the one or more inactive time slot sets may be calculated as the dormancy timer value. For yet another example, a weighted average of the numbers of inactive time slot in the one or more inactive time slot sets may be calculated as the dormancy timer value. For still yet another example, a maximum value of the numbers of inactive time slot in the one or more inactive time slot sets may be calculated as the dormancy timer value.

In accordance with embodiments of the present invention, the method 100 may optionally comprise a step of adjusting the dormancy timer value according to current traffic information, e.g., the number of active radio links on which there is traffic currently. Further details for adjusting the dormancy timer value may be found in descriptions with respect to step S203 of FIG. 2.

In accordance with further embodiments of the present invention, the method 100 may optionally comprise a step of releasing the at least one radio link according to the dormancy timer value. There may be several implementations for releasing a radio link. For example, a radio link may be first selected from the at least one radio link, wherein the selected radio link has longest time continuity of at least one inactive time slot; and the selected radio link may be released in response to a user request for radio resource and/or when lacking of radio resource. Further details for releasing a radio link may be found in descriptions in connection to step S204 of FIG. 2.

With respect to embodiments illustrated by FIG. 1, it is advantageous that, different from the existing solutions, the historical traffic information is taken into account for determining a more accurate value for a dormancy timer. It is also advantageous that, due to the more accurate value, resource utilization may be effectively increased and the user experience may be effectively improved.

Figure 2:
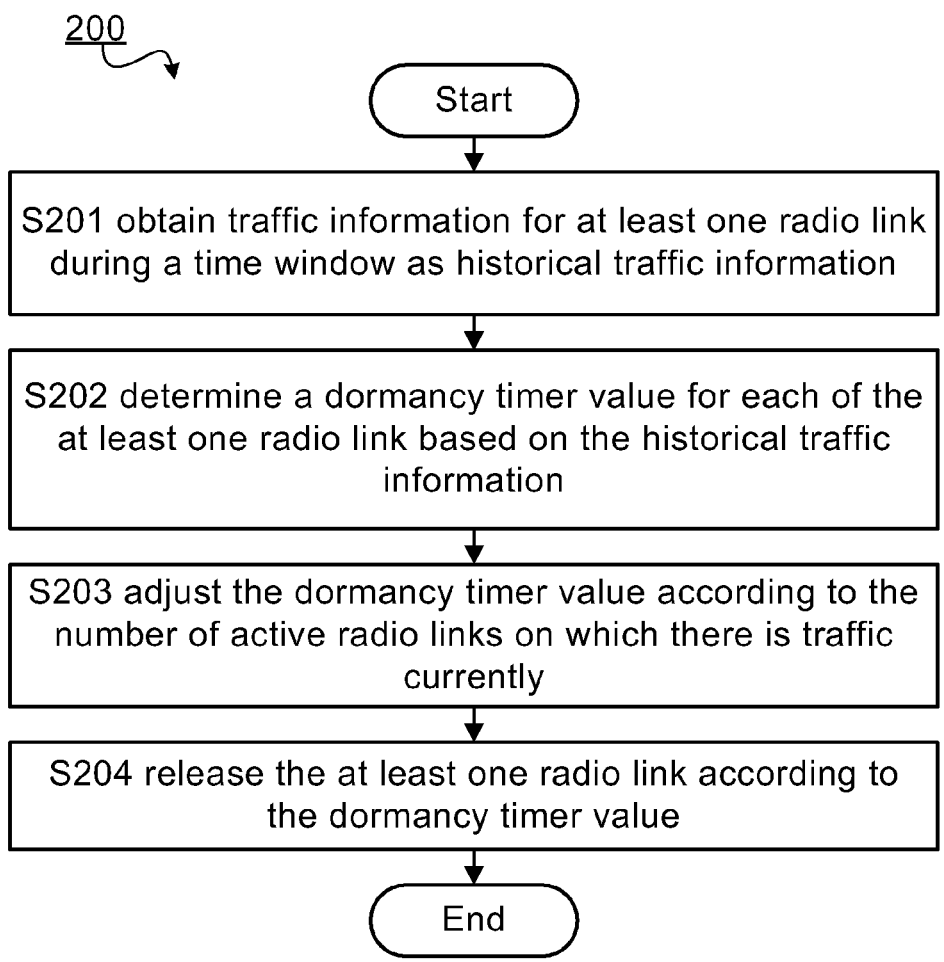
FIG. 2 illustrates a flow chart of a method 200 for determining a dormancy timer value according to an embodiment of the invention.

Reference is now made to FIG. 2, which illustrates a flow chart of a method 200 for determining a dormancy timer value according to an embodiment of the invention. Method 200 may be considered as an embodiment of method 100 described above with reference to FIG. 1. In the following description of method 200, one dormancy timer value is determined for each of radio link(s) in the wireless network based on historical traffic information during a time window. Optionally, the determined dormancy timer value may be adjusted according to current active state(s) of the radio link(s). Still further, the radio link(s) may be optionally released according to the determined dormancy timer value. However, it is noted that this is only for the purpose of illustrating the principles of the present invention, rather than limiting the scope thereof.

After method 200 starts, at step S201, traffic information for at least one radio link during a time window may be obtained as historical traffic information.

Step S201 in method 200 may be considered as an implementation of step S101 in method 100 as described above. Similar with step S101, the historical traffic information for at least one radio link is also obtained at S201. More specifically, at step S201, a time window is taken into account in obtaining the historical traffic information, and the traffic information for at least one radio link during the time window is obtained as historical traffic information. Further details for releasing a radio link according to the dormancy timer value may be found in descriptions in connection to FIG. 3.

At step S202, a dormancy timer value for each of the at least one radio link is determined based on the historical traffic information.

Step S202 in method 200 may be considered as an implementation of step S102 in method 100 as described above. Similar with step S102, the dormancy timer value is also determined based on the historical traffic information at S202.

More specifically, at step S202, one dormancy timer value is determined for each of the radio links in the wireless network based on the historical traffic information. For example, supposing there are N radio links in the wireless network, N dormancy timer values may be determined based on historical traffic information for the N radio links, and one dormancy timer value is used for one of the N radio links. Further details for releasing a radio link according to the dormancy timer value may be found in descriptions in connection to FIG. 4.

At step S203, the dormancy timer value is adjusted according to the number of active radio links on which there is traffic currently.

Step S203 is an optional step for the method according to embodiments of the present invention. In some embodiments of the present invention, for a wireless network, if there are less active radio links currently, the dormancy timer value(s) for radio link(s) in the wireless network may be adjusted with a larger headroom, e.g., 100%; and if there are more active radio links currently, the dormancy timer value(s) may be adjusted with a smaller headroom, e.g., 20%. As such, the dormancy timer value according to embodiments of the present invention may be adjusted in view of current traffic information.

In an embodiment, as a non-limiting example, when the number of active radio links is less than 41, a headroom of 100% may be added to the dormancy timer value determined at step S202; when the number of active radio links is between 41 and 46, a headroom of 50% may be added to the dormancy timer value; and when the number of active radio links is more than 46, a headroom of 20% may be added to the dormancy timer value. According to embodiments of the present application, the headroom may be added or applied to the dormancy timer value in several ways. For example, the adjusted dormancy timer value (denoted as $DT_{adjust}$) may be obtained based on an unadjusted dormancy timer value (denoted as DT) and the headroom as follows:

$$DT_{adjust} = DT \times (1 + \text{headroom}) \qquad (1)$$

It is to be noted that, for different wireless network with different radio links, different headroom may be applied to the dormancy timer value. The above numbers and/or values are only examples for purpose of illustration, rather than limitation.

According to further embodiments of the present invention, there may be an upper limit and/or a lower limit for the dormancy timer value. The dormancy timer value may be adjusted based on the upper limit and/or the lower limit. Specifically, if the dormancy timer value determined at step S202 or the dormancy timer value adjusted at step S203 exceeds an upper limit preset or predetermined for the at least one radio link in the wireless network, the dormancy timer value may be set to the upper limit, i.e., a maximum value for the dormancy timer (e.g., 20 seconds). Further, if the dormancy timer value determined at step S202 or the dormancy timer value adjusted at step S203 exceeds a lower limit preset or predetermined for the at least one radio link, the dormancy timer value may be set to the lower limit, i.e., a minimum value for the dormancy timer (e.g., 5 seconds). By setting the upper limit and/or lower limit, the dormancy timer value avoids to be too large or too small. Accordingly, such a dormancy timer value may be more robust.

At step S204, the at least one radio link is released according to the dormancy timer value.

Step S204 is also an optional step for the method according to embodiments of the present invention. In accordance with embodiments of the present invention, the at least one radio link may be released in several ways or cases. According to an embodiment of the present invention, a radio link which has longest time continuity of at least one inactive time slot may be selected from the at least one radio link, and then the selected radio link may be released in response to a user request for radio resource. As an alternative or an additional solution, after a radio link which has longest time continuity of at least one inactive time slot is selected, the selected radio link may be released when lacking of radio resource in the wireless network.

Specifically, in some embodiments, when there is no traffic on a radio link for a period of time, which is larger than the dormancy timer value determined with the radio link, the radio link or the user associated with the radio link (e.g., a mobile terminal/user equipment using the radio link) may be considered as a candidate to be released. For example, the radio link or the associated user may be added into a candidate list which comprises one or more candidates to be released. In the candidate list, the candidates may be ranked according to their respective dormancy timer values. In response to a user request for radio resource and/or when lacking of radio resource, the candidate radio link with highest rank may be selected from the candidate list and released. Alternatively, upon receipt of a user request for radio resource, candidate radio links whose ranks are higher than a predetermined threshold may be released.

Further, in some other embodiments, in response to a user request for radio resource (e.g., to setup a call) and/or when lacking of radio resource, a radio link (or a user equipment associated with the radio link) which has largest dormancy timer value may be selected from the radio links in the RAN. Still further, in some other embodiments, in response to a user request for radio resource and/or when lacking of radio resource, a radio link which has largest dormant time may be selected from the radio links in the RAN, wherein the dormant time may be defined as a period of time from the end of the last active duration (i.e., the last instant when there is traffic on the radio link) to the current instant.

With respect to embodiments illustrated by FIG. 2, it is advantageous that, different from the existing solutions, one dormancy timer value is determined for each radio link in the wireless network based on historical traffic information of the each radio link, so that the determined dormancy timer value is more targeted and accurate. It is also advantageous that the determined dormancy timer value may be adjusted to better adapt to real traffic conditions and system requirements.

Figure 3:
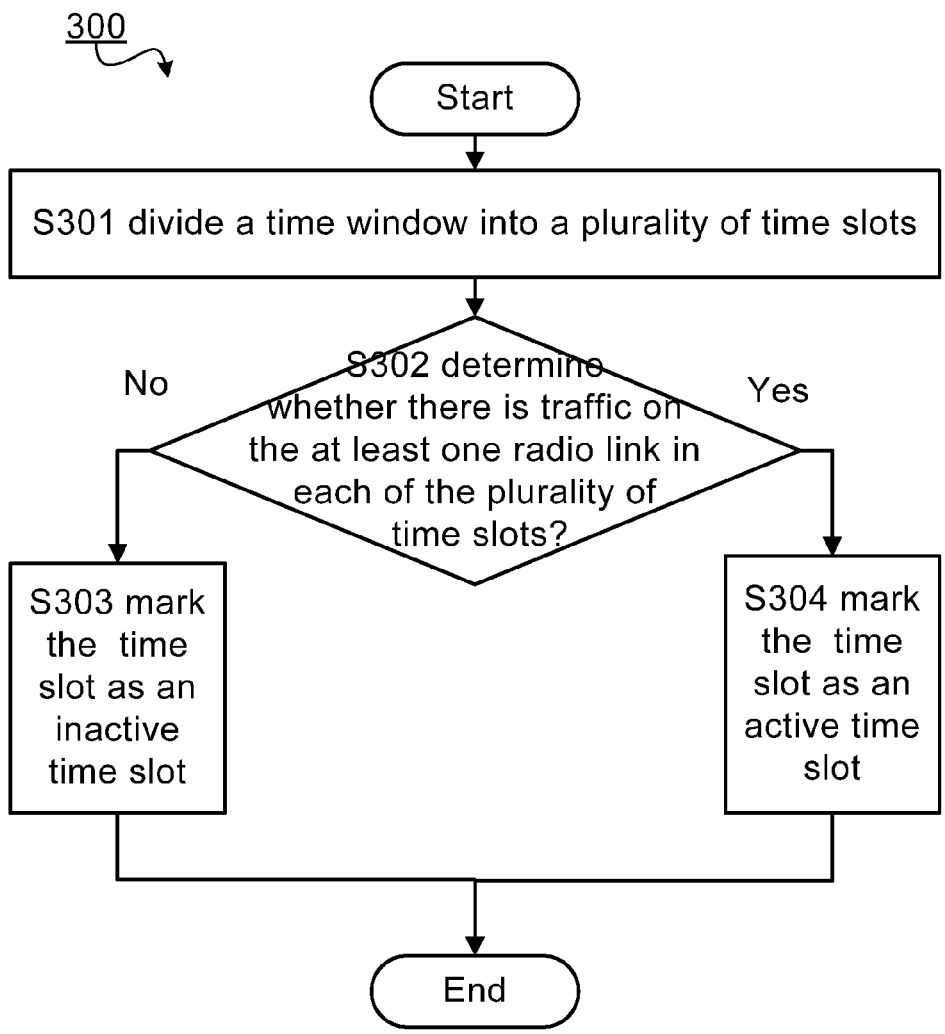
FIG. 3 illustrates a flow chart of a method 300 for obtaining historical traffic information according to an embodiment of the invention.

Reference is now made to FIG. 3, which illustrates a flow chart of a method 300 for obtaining historical traffic information according to an embodiment of the invention. Method 300 may be considered as an embodiment of step S101 of the method 100 described above with reference to FIG. 1 or step S201 of the method 200 with reference to FIG. 2. In the following description of method 300, the time window is divided into a plurality of time slots. According to whether there is traffic on a radio link in one time slot, this time slot may be marked as active or inactive. However, it is noted that this is only for the purpose of illustrating the principles of the present invention, rather than limiting the scope thereof.

After method 300 starts, at step S301, divide a time window into a plurality of time slots.

Figure 5:
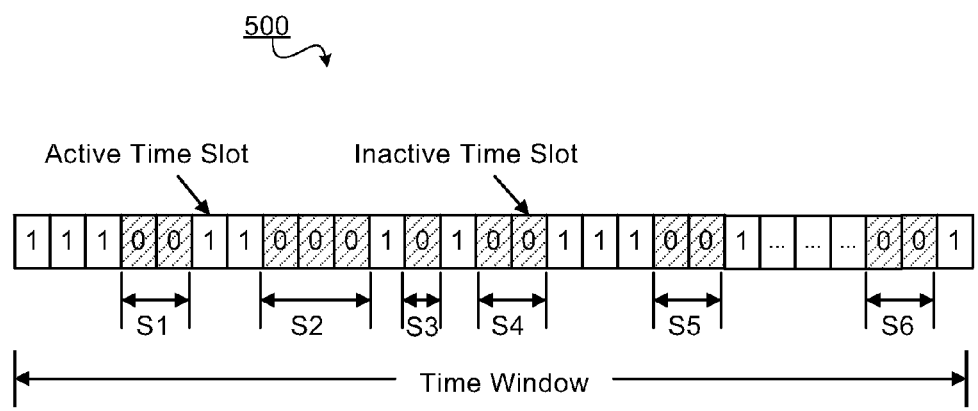
FIG. 5 illustrates a schematic diagram 500 of a time window according to an embodiment of the invention.

As discussed, according embodiments of the present invention, a time window may comprise a plurality of time slots. One time slot may represent a portion of the time window. FIG. 5 illustrates a schematic diagram 500 of a time window according to an embodiment of the invention, wherein the time window is equally divided into multiple time slots.

At step S302, whether there is traffic on the at least one radio link in each of the plurality of time slots is determined.

In accordance with further embodiments of the present invention, in response to determining that there is no traffic on the at least one radio link in a time slot, the time slot is marked as an inactive time slot at step S303; and in response to determining that there is traffic on the at least one radio link in a time slot, the time slot is marked as an active time slot at step S304.

As seen from FIG. 5, with respect to the multiple time slots in the time window, a time slot marked as "1" represents an active time slot of a radio link and a time slot marked as "0" represents an inactive time slot of the radio link. It is to be noted that marking a time slot with "0" or "1" is just an example. Alternatively, a time slot marked as "0"

may represent an active time slot of a radio link and a time slot marked as "1" may represent an inactive time slot of the radio link. In addition, other suitable flags such as "TRUE" or "FALSE" may also be applicable to embodiments of the present application.

It is to be noted that, in embodiments of the present invention, the case of "there is no traffic" indicates either there is not any traffic, or there is little traffic but the traffic amount is too small to be taken into account.

After steps S301-S304, the historical traffic information for at least one radio link may be obtained. The historical traffic information may comprise traffic information on the plurality of the time slots in the time window, for example, the number and position of active time slot(s), the number and position of inactive time slot(s), and/or the like.

Figure 4:
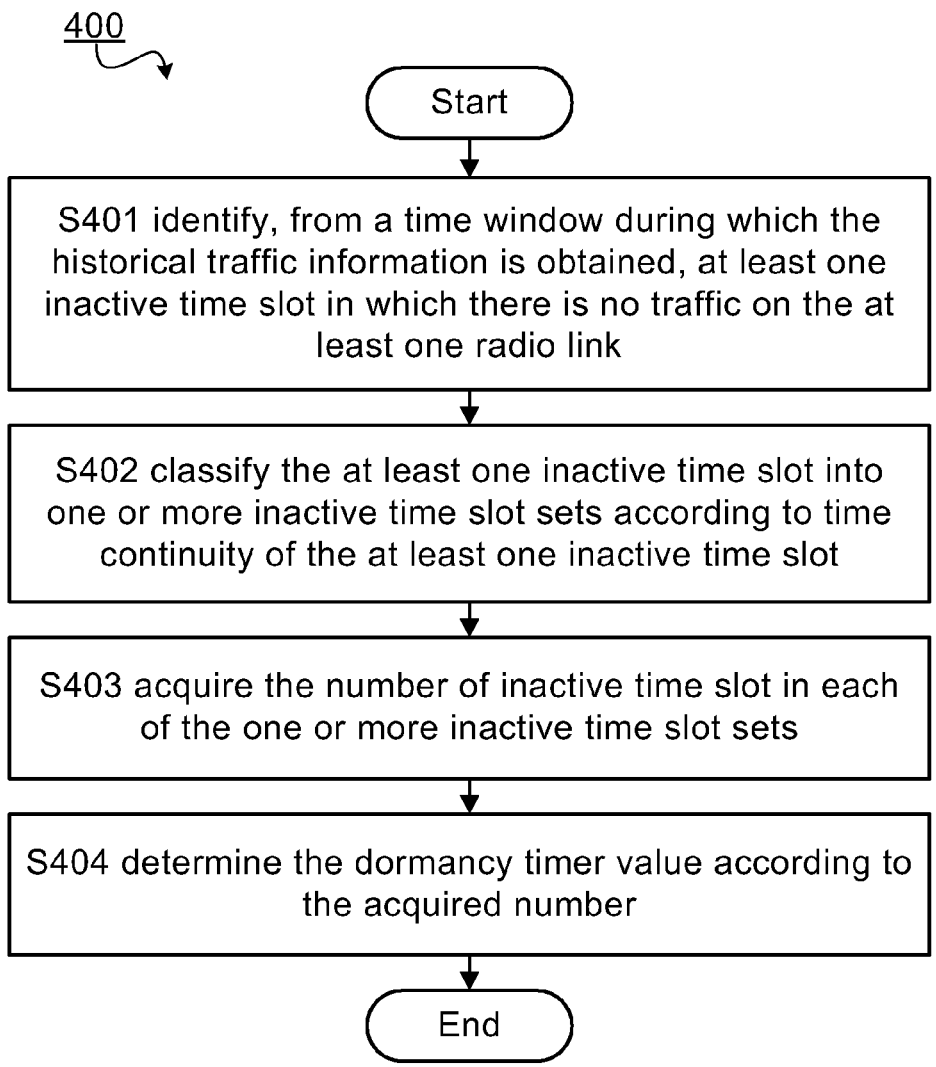
FIG. 4 illustrates a flow chart of a method 400 for determining a dormancy timer value based on the historical traffic information according to an embodiment of the invention.

Reference is now made to FIG. 4, which illustrates a flow chart of a method 400 for determining a dormancy timer value based on the historical traffic information according to an embodiment of the invention. Method 400 may be considered as an embodiment of step S102 of the method 100 described above with reference to FIG. 1 or step S202 of the method 200 with reference to FIG. 2. In the following description of method 400, the dormancy timer value may be determined based on the number of inactive time slots, e.g., based on statistics or calculation made to the number of inactive time slots. However, it is noted that this is only for the purpose of illustrating the principles of the present invention, rather than limiting the scope thereof.

After method 400 starts, at step S401, at least one inactive time slot in which there is no traffic on the at least one radio link is identified from a time window during which the historical traffic information is obtained.

In accordance with embodiments of the present invention, the historical traffic information is obtained during a time window and the time window may comprise a plurality of time slots. For one radio link, a time slot may be classified as an active or an inactive time slot depending on whether there is traffic on the radio link in the time slot. As such, based on the historical traffic information, one or more inactive time slots may be identified. With respect to the time window illustrated in FIG. 5, the $4^{th}$ time slot may be determined as an inactive time slot because it is marked with "0". Further, the $5^{th}$, $8^{th}$, $9^{th}$, $10^{th}$ time slots may also be determined as inactive time slots.

At step S402, the at least one inactive time slot is classified into one or more inactive time slot sets according to time continuity of the at least one inactive time slot.

According to embodiments of the present invention, there may be multiple inactive time slots in the time window. The inactive time slots may comprise several continuous time slots, or a separated inactive time slot which is not adjacent to any other inactive time slot. Accordingly, the inactive time slots may have different time continuity. In some embodiments, the time continuity of inactive time slots may be obtained from the historical traffic information. Upon obtaining the time continuity of inactive time slots, they may be classified into one or more inactive time slot sets. As seen from FIG. 5, the $4^{th}$ and the $5^{th}$ time slots are inactive and continuous and they are not adjacent to any other inactive time slots, thus they may be classified into one inactive time slot set (denoted as "S1" in FIG. 5). Thus, S1 comprises two elements. Further, since the $12^{th}$ time slot is inactive and is not adjacent to any other inactive time slots, this time slot may be classified into one inactive time slot set (denoted as "S3" in FIG. 5), wherein S3 comprises only one elements.

As illustrated by embodiments with respect to FIG. 5, based on time continuity of the inactive time slots, these inactive time slots may be classified into six inactive time slot sets, i.e., S1, S2, S3, S4, S5 and S6.

At step S403, the number of inactive time slot in each of the one or more inactive time slot sets is acquired.

In accordance with embodiments of the present invention, each inactive time slot set may comprise one or more inactive time slots. As shown in FIG. 5, the set S1 comprises 2 inactive time slots, the set S2 comprises 3 inactive time slots, the set S3 comprises 1 inactive time slot, the set S4 comprises 2 inactive time slots, the set S5 comprises 2 inactive time slots, and the set S6 also comprises 2 inactive time slots. According to the classifying results of step S402, the number of inactive time slot in each inactive time slot set may be acquired.

At step S404, the dormancy timer value is determined according to the acquired number.

As discussed at step S102, in accordance with embodiments of the present invention, the dormancy timer value may be determined in multiple ways. In implementations, the dormancy timer value may be determined by performing CDF, calculating average, calculating weighted average, and/or calculating maximum of the numbers of inactive time slot in respective inactive time slot sets.

Taken the embodiment illustrated with FIG. 5 for example, the cumulative density function (i.e., CDF) may be performed on inactive time slot(s) in each inactive time slot set. In other words, at this step, CDF may be performed with respect to S1, S2, S3, S4, S5 and S6. Afterwards, a time interval that maps to a predetermined percentage (e.g., 95%) in the CDF may be selected as a reference interval. It means that in the past time window, if there is traffic on a radio link, it will most likely happen within the reference interval (e.g., M seconds). In other words, if there is no traffic on a radio link for M seconds, it will probably not happen anymore. According to some embodiments of the present invention, the dormancy timer value may be determined as the reference interval. It is noted that the predetermined percentage is configurable, and it may be configured as some other values, such as 90%, 96%, etc.

According to some other embodiments of the present invention, the dormancy timer value may be determined as the maximum value of inactive time slot numbers in respective sets. For example, in the embodiment shown in FIG. 5, the inactive time slot numbers in the six sets (S1 through S6) are 2, 3, 1, 2, 2 and 2, respectively. Since the maximum value is 3, the dormancy timer value may be determined as the length of 3 time slots.

According to further embodiments of the present invention, the dormancy timer value may be determined as the average of inactive time slot numbers in respective sets. Referring to FIG. 5 again, since the average of 2, 3, 1, 2, 2 and 2 is 2, the dormancy timer value may be determined as the length of 2 time slots.

For the purpose of illustrating spirit and principle of the present invention, some specific embodiments thereof have been described above. It will be appreciated by a person skilled in the art that embodiments of the present invention may be varied or modified without departing from the scope of the present invention.

Figure 6:
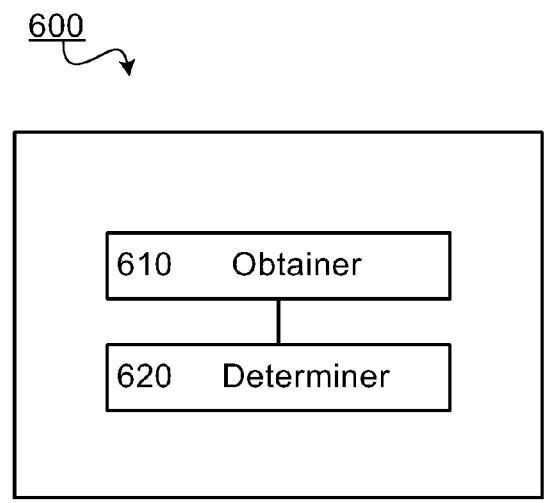
FIG. 6 illustrates a block diagram of an apparatus 600 for determining a dormancy timer value according to embodiments of the invention.

Reference is now made to FIG. 6, which illustrates a block diagram of an apparatus 600 for determining a dormancy timer value according to embodiments of the invention. As shown, the apparatus 600 comprises: an obtainer 610 configured to obtain historical traffic information for at least one radio link in the wireless network; and a determiner 620 configured to determine a dormancy timer value for the at least one radio link based on the obtained historical traffic information.

In accordance with embodiments of the present invention, the obtainer 610 may comprise: an obtaining unit configured to obtain traffic information for the at least one radio link during a time window as the historical traffic information.

In some embodiments, the obtaining unit may comprise: a dividing unit configured to divide the time window into a plurality of time slots; a slot-type determining unit configured to determine whether there is traffic on the at least one radio link in each of the plurality of time slots; a first marking unit configured to, in response to determining that there is no traffic on the at least one radio link in a time slot, mark the time slot as an inactive time slot; and a second marking unit configured to, in response to determining that there is traffic on the at least one radio link in a time slot, mark the time slot as an active time slot.

In accordance with embodiments of the present invention, the determiner 620 may comprise: a first determining unit configured to determine the dormancy timer value for each of the at least one radio link based on the historical traffic information.

In accordance with embodiments of the present invention, the determiner 620 may comprise: an identifying unit configured to identify, from a time window during which the historical traffic information is obtained, at least one inactive time slot in which there is no traffic on the at least one radio link; and a second determining unit configured to determine the dormancy timer value for the at least one radio link based on the at least one inactive time slot.

In some embodiments, the second determining unit may comprise: a classifying unit configured to classify the at least one inactive time slot into one or more inactive time slot sets according to time continuity of the at least one inactive time slot, such that inactive time slots in one inactive time slot set are continuous; an acquiring unit configured to acquire the number of inactive time slot in each of the one or more inactive time slot sets; and a third determining unit configured to determine the dormancy timer value according to the number of inactive time slot in each of the one or more inactive time slot sets.

In some embodiments, the third determining unit may comprise at least one of the following: a CDF performing unit configured to perform CDF on the numbers of inactive time slot in the one or more inactive time slot sets and calculating a value that maps to a predetermined percentage in the CDF as the dormancy timer value; a first calculating unit configured to calculate an average of the numbers of inactive time slot in the one or more inactive time slot sets as the dormancy timer value; a second calculating unit configured to calculate a weighted average of the numbers of inactive time slot in the one or more inactive time slot sets as the dormancy timer value; and a third calculating unit configured to calculate a maximum value of the numbers of inactive time slot in the one or more inactive time slot sets as the dormancy timer value.

Figure 7:
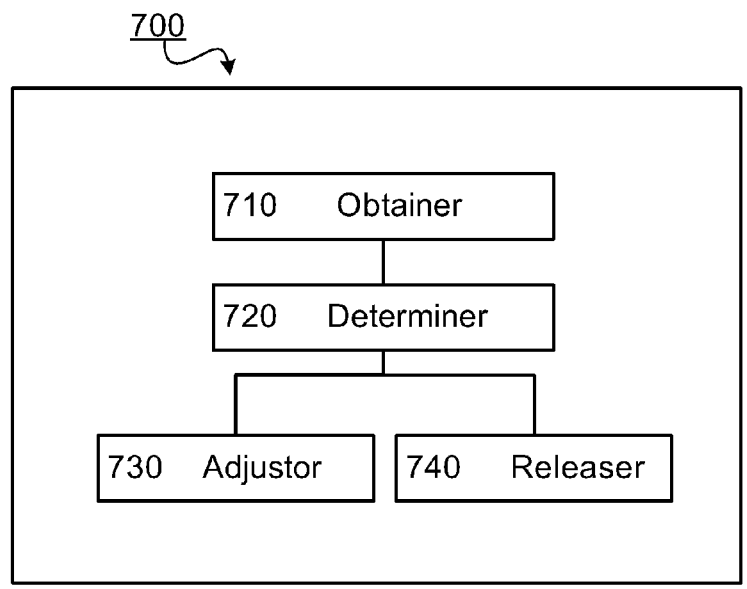
FIG. 7 illustrates a block diagram of an apparatus 700 for determining a dormancy timer value according to embodiments of the invention.

Reference is now made to FIG. 7, which illustrates a block diagram of an apparatus 700 for determining a dormancy timer value according to embodiments of the invention. As shown, the apparatus 700 comprises: an obtainer 710 configured to obtain historical traffic information for at least one radio link in the wireless network; a determiner 720 configured to determine a dormancy timer value for the at least one radio link based on the obtained historical traffic information; an adjustor 730 configured to adjust the dormancy timer value according to the number of active radio links on which there is traffic currently; and a releaser 740 configured to release the at least one radio link according to the dormancy timer value.

In accordance with embodiments of the present invention, similar with the obtainer 610, the obtainer 710 may also comprise: an obtaining unit configured to obtain traffic information for the at least one radio link during a time window as the historical traffic information.

In accordance with embodiments of the present invention, similar with the determiner 620, the determiner 720 may comprise: a first determining unit configured to determine the dormancy timer value for each of the at least one radio link based on the historical traffic information. Still further, in some embodiments, the determiner 720 may comprises: an identifying unit configured to identify, from a time window during which the historical traffic information is obtained, at least one inactive time slot in which there is no traffic on the at least one radio link; and a second determining unit configured to determine the dormancy timer value for the at least one radio link based on the at least one inactive time slot.

In accordance with embodiments of the present invention, the releaser 740 may comprise: a selecting unit configured to select, from the at least one radio link, a radio link which has longest time continuity of at least one inactive time slot; and a releasing unit configured to, in response to a user request for radio resource and/or when lacking of radio resource, release the selected radio link.

It is to be noted that the apparatus 600 or 700 may be implemented in a RNC, a BS, a BSC, a gateway, a relay, a server, or any other applicable device, and the apparatus 600 or 700 may be applied in several communication networks, such as a GSM, CDMA, UMTS and LTE network. It is also to be noted that the obtainer 610 and determiner 620 may be implemented by any suitable technique either known at present or developed in the future. It is also to be noted that the obtainer 710, determiner 720, adjustor 730 and releaser 740 may also be implemented by any suitable technique either known at present or developed in the future. Further, a single device shown in FIG. 6 or FIG. 7 may be alternatively implemented in multiple devices separately, and multiple separated devices may be implemented in a single device. The scope of the present invention is not limited in these regards.

It is noted that, in some embodiment of the present disclosure, the apparatus 600 or 700 may be configured to implement functionalities as described with reference to FIGS. 1-4. Therefore, the features discussed with respect to any of methods 100 to 400 may apply to the corresponding components of the apparatus 600 or 700. It is further noted that the components of the apparatus 600 or 700 may be embodied in hardware, software, firmware, and/or any combination thereof. For example, the components of the apparatus 600 or 700 may be respectively implemented by a circuit, a processor or any other appropriate selection device. Those skilled in the art will appreciate that the aforesaid examples are only for illustration not limitation.

Figure 8:
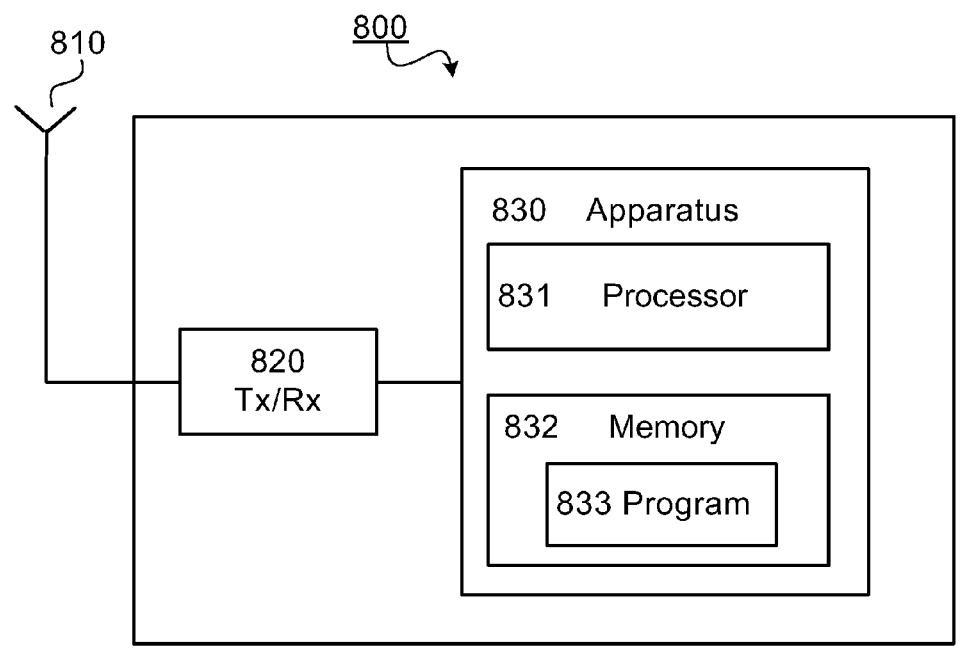
FIG. 8 illustrates a block diagram of a device 800 that is suitable for use in practicing the exemplary embodiments of the present invention.

Reference is now made to FIG. 8, which illustrates a block diagram of a device 800 that is suitable for use in practicing the exemplary embodiments of the present invention. The device 800 may comprise an antenna 810, a transmitter (TX)/receiver (RX) 820 coupled to the antenna 810, and an apparatus 830 coupled to the TX/RX 820. Through the antenna 810, the device 800 may communicate with external communication devices or access external networks or systems. The TX/RX 820 is for bidirectional wireless communications with external communication devices. The apparatus 830 may comprise at least one processor 831; and at least one memory 832 including compute program instructions 833, wherein the at least one memory 832 and computer program instructions 833 are configured to, with the at least one processor 831, cause the apparatus 830 at least to obtain historical traffic information for at least one radio link in the wireless network; and determine a dormancy timer value for the at least one radio link based on the obtained historical traffic information.

The at least one processor is suitable for use with embodiments of the present disclosure and may include, by way of example, both general and special purpose processors already known or developed in the future. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus to at least perform according to any of methods 100 to 400 as discussed above. It is to be noted that although FIG. 8 shows that the apparatus 830 is included in the device 800 (such as a RNC, a BS, etc.), the apparatus 830 may be associated with the device 800 (for example, interfaces with the device 800), instead of being a part of the device 800.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 1 to 4 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit, FPGA or ASIC that is configurable to operate in accordance with the exemplary embodiments of the present invention.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various modifications, adaptations to the foregoing exemplary embodiments of this invention may become apparent to those skilled in the relevant arts in view of the foregoing description, when read in conjunction with the accompanying drawings. Any and all modifications will still fall within the scope of the non-limiting and exemplary embodiments of this invention. Furthermore, other embodiments of the inventions set forth herein will come to mind to one skilled in the art to which these embodiments of the invention pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for determining a dormancy timer value in a wireless network, comprising:
  obtaining historical traffic information for at least one radio link in the wireless network;
  determining a dormancy timer value for the at least one radio link based on the obtained historical traffic information; and
  adjusting the dormancy timer value according to a number of active radio links on which there is traffic currently.

2. The method of claim 1, wherein determining a dormancy timer value for the at least one radio link based on the obtained historical traffic information comprises:
  determining the dormancy timer value for each of the at least one radio link based on the historical traffic information.

3. The method of claim 1, wherein determining a dormancy timer value for the at least one radio link based on the obtained historical traffic information comprises:
  identifying, from a time window during which the historical traffic information is obtained, at least one inactive time slot in which there is no traffic on the at least one radio link; and
  determining the dormancy timer value for the at least one radio link based on the at least one inactive time slot.

4. The method of claim 3, wherein determining the dormancy timer value for the at least one radio link based on the at least one inactive time slot comprises:
  classifying the at least one inactive time slot into one or more inactive time slot sets according to time continuity of the at least one inactive time slot, such that inactive time slots in one inactive time slot set are continuous;
acquiring the number of inactive time slot in each of the one or more inactive time slot sets; and
determining the dormancy timer value according to the number of inactive time slot in each of the one or more inactive time slot sets.

5. The method of claim 4, wherein determining the dormancy timer value according to the number of inactive time slot in each of the one or more inactive time slot sets comprises at least one of the following operations:
performing cumulative density function (CDF) on the numbers of inactive time slot in the one or more inactive time slot sets and calculating a value that maps to a predetermined percentage in the CDF as the dormancy timer value;
calculating an average of the numbers of inactive time slot in the one or more inactive time slot sets as the dormancy timer value;
calculating a weighted average of the numbers of inactive time slot in the one or more inactive time slot sets as the dormancy timer value; and
calculating a maximum value of the numbers of inactive time slot in the one or more inactive time slot sets as the dormancy timer value.

6. The method of claim 1, wherein obtaining historical traffic information for at least one radio link in the wireless network comprises:
obtaining traffic information for the at least one radio link during a time window as the historical traffic information.

7. The method of claim 6, wherein obtaining traffic information for the at least one radio link in a time window as the historical traffic information comprises:
dividing the time window into a plurality of time slots;
determining whether there is traffic on the at least one radio link in each of the plurality of time slots;
in response to determining that there is no traffic on the at least one radio link in a time slot, marking the time slot as an inactive time slot; and
in response to determining that there is traffic on the at least one radio link in a time slot, marking the time slot as an active time slot.

8. The method of claim 1, further comprising:
releasing the at least one radio link according to the dormancy timer value.

9. The method of claim 8, wherein releasing the at least one radio link according to the dormancy timer value comprises:
selecting, from the at least one radio link, a radio link which has longest time continuity of at least one inactive time slot; and
in response to a user request for radio resource and/or when lacking of radio resource, releasing the selected radio link.

10. An apparatus for determining a dormancy timer value in a wireless network, comprising:
an obtainer configured to obtain historical traffic information for at least one radio link in the wireless network;
a determiner configured to determine a dormancy timer value for the at least one radio link based on the obtained historical traffic information; and
an adjustor configured to adjust the dormancy timer value according to a number of active radio links on which there is traffic currently.

11. An apparatus for determining a value of a dormancy timer in a wireless network, comprising:
at least one processor; and
at least one memory including compute program instructions,
wherein the at least one memory and computer program instructions are configured to, with the at least one processor, cause the apparatus at least to:
obtain historical traffic information for at least one radio link in the wireless network;
determine a dormancy timer value for the at least one radio link based on the obtained historical traffic information; and
adjust the dormancy timer value according to a number of active radio links on which there is traffic currently.

12. The apparatus of claim 11,
wherein the at least one memory and computer program instructions are further configured to, with the at least one processor, cause the apparatus at least to determine the dormancy timer value for each of the at least one radio link based on the historical traffic information.

13. The apparatus of claim 11, wherein the at least one memory and computer program instructions are further configured to, with the at least one processor, cause the apparatus at least to:
identify, from a time window during which the historical traffic information is obtained, at least one inactive time slot in which there is no traffic on the at least one radio link; and
determine the dormancy timer value for the at least one radio link based on the at least one inactive time slot.

14. The apparatus of claim 13, wherein the at least one memory and computer program instructions are further configured to, with the at least one processor, cause the apparatus at least to:
classify the at least one inactive time slot into one or more inactive time slot sets according to time continuity of the at least one inactive time slot, such that inactive time slots in one inactive time slot set are continuous;
acquire the number of inactive time slot in each of the one or more inactive time slot sets; and
determine the dormancy timer value according to the number of inactive time slot in each of the one or more inactive time slot sets.

15. The apparatus of claim 14, wherein the at least one memory and computer program instructions are further configured to, with the at least one processor, cause the apparatus at least to:
perform a cumulative density function (CDF) on the numbers of inactive time slot in the one or more inactive time slot sets and calculating a value that maps to a predetermined percentage in the CDF as the dormancy timer value;
calculate an average of the numbers of inactive time slot in the one or more inactive time slot sets as the dormancy timer value;
calculate a weighted average of the numbers of inactive time slot in the one or more inactive time slot sets as the dormancy timer value; and
calculate a maximum value of the numbers of inactive time slot in the one or more inactive time slot sets as the dormancy timer value.

16. The apparatus of claim 11, wherein the at least one memory and computer program instructions are further configured to, with the at least one processor, cause the apparatus at least to:

obtain traffic information for the at least one radio link during a time window as the historical traffic information.

17. The apparatus of claim 16, wherein the at least one memory and computer program instructions are further configured to, with the at least one processor, cause the apparatus at least to:
divide the time window into a plurality of time slots;
determine whether there is traffic on the at least one radio link in each of the plurality of time slots;
in response to determining that there is no traffic on the at least one radio link in a time slot, mark the time slot as an inactive time slot; and
in response to determining that there is traffic on the at least one radio link in a time slot, mark the time slot as an active time slot.

18. A computer program product, comprising at least one computer readable storage medium having a computer readable program code portion stored thereon, the computer readable program code portion comprising:
program code instructions for obtaining historical traffic information for at least one radio link in the wireless network;
program code instructions for determining a dormancy timer value for the at least one radio link based on the obtained historical traffic information; and
program code instructions for adjusting the dormancy timer value according to a number of active radio links on which there is traffic currently.

* * * * *